US011201573B2

(12) United States Patent
Ogura et al.

(10) Patent No.: US 11,201,573 B2
(45) Date of Patent: Dec. 14, 2021

(54) DRIVING DEVICE, IMAGE FORMING APPARATUS, AND CONTROL PROGRAM

(71) Applicant: KONICA MINOLTA, INC., Tokyo (JP)

(72) Inventors: Keigo Ogura, Tokyo (JP); Takumi Shirakuma, Tokyo (JP); Kenji Izumiya, Hachioji (JP); Hidenori Mine, Tachikawa (JP); Hirokatsu Kodama, Koganei (JP)

(73) Assignee: KONICA MINOLTA, INC., Tokyo (JP)

( * ) Notice: Subject to any disclaimer, the term of this patent is extended or adjusted under 35 U.S.C. 154(b) by 120 days.

(21) Appl. No.: 16/446,495

(22) Filed: Jun. 19, 2019

(65) Prior Publication Data

US 2019/0393810 A1 Dec. 26, 2019

(30) Foreign Application Priority Data

Jun. 22, 2018 (JP) .............................. JP2018-118720

(51) Int. Cl.
*H02P 5/46* (2006.01)
*G03G 15/00* (2006.01)

(52) U.S. Cl.
CPC .......... *H02P 5/46* (2013.01); *G03G 15/6529* (2013.01)

(58) Field of Classification Search
CPC .............................. H02P 5/46; G03G 15/6529
USPC ......................................................... 318/39
See application file for complete search history.

(56) References Cited

U.S. PATENT DOCUMENTS

| 5,037,216 A * | 8/1991 | Nubson .................. G06K 1/126 400/120.16 |
| 7,323,886 B2 | 1/2008 | Lee |
| 2006/0033508 A1 | 2/2006 | Lee |
| 2017/0305426 A1 * | 10/2017 | Balboni ................ F16H 61/444 |
| 2018/0373185 A1 * | 12/2018 | Matsuo .............. G03G 15/2039 |

FOREIGN PATENT DOCUMENTS

| JP | 2002259957 A | 9/2002 |
| JP | 2006017988 A | 1/2006 |
| JP | 2010066448 A * | 3/2010 |

OTHER PUBLICATIONS

Translation of JP-2010066448-A (Year: 2010).*

* cited by examiner

*Primary Examiner* — Kawing Chan
(74) *Attorney, Agent, or Firm* — Holtz, Holtz & Volek PC

(57) ABSTRACT

A driving device includes: a first motor that transmits power to a rotation shaft of a conveyance roller for conveying a paper sheet; a second motor that transmits power to the rotation shaft of the conveyance roller; and a motor controller that controls rotational speeds of the first and second motors by changing a control value, wherein the motor controller controls the control value of the first motor at multiple steps at a time of acceleration or deceleration and changes the control value of the second motor according to a change range of the control value of the first motor in synchronization with a timing when the control value of the first motor is changed.

17 Claims, 16 Drawing Sheets

FIG. 8A

| PHYSICAL ADDRESS | SPEED TABLE USED AT THE TIME OF ACCELERATION AND DECELERATION IN COMMON | | |
|---|---|---|---|
| SRAM addr | NEXT addr | SPEED DATA | PWM TABLE [%] |
| 0 | 1 | 13332 | 0 |
| 1 | 2 | 7659 | 3 |
| 2 | 3 | 6114 | 6 |
| 3 | 4 | 5176 | 9 |
| 4 | 5 | 4570 | 12 |
| 5 | 6 | 4136 | 15 |
| 6 | 7 | 3806 | 18 |
| 7 | 8 | 3545 | 21 |
| 8 | 9 | 3330 | 24 |
| 9 | 10 | 3151 | 27 |
| 10 | 11 | 2997 | 30 |
| 11 | 12 | 2865 | 33 |
| 12 | 13 | 2748 | 36 |
| 13 | 14 | 2644 | 39 |
| 14 | 15 | 2552 | 42 |
| 15 | 16 | 2468 | 45 |
| 16 | 17 | 2392 | 48 |
| 17 | 18 | 2323 | 51 |
| 18 | 19 | 2259 | 54 |
| 19 | 20 | 2201 | 57 |
| 20 | 21 | 2147 | 60 |
| ... | ... | ... | ... |

FIG. 8B

| | ACCELERATION TABLE BEFORE STABILIZATION | |
|---|---|---|
| SRAM addr | ACCERELATED SPEED DATA | PWM TABLE [%] |
| 256 | 32000 | 5 |
| 257 | 31000 | 4.5 |
| 258 | 31000 | 4.5 |
| 259 | 30000 | 4.5 |
| 260 | 30000 | 4 |
| 261 | 29000 | 4 |
| 262 | 28000 | 4 |
| 263 | 27000 | 3.5 |
| 264 | 26000 | 3.5 |
| 265 | 25000 | 3 |
| 266 | 24000 | 2.5 |
| 267 | 24000 | 2 |
| 268 | 23000 | 1.5 |
| 269 | 23000 | 1 |
| ... | ... | ... |

FIG. 11

| REGISTER SETTING | | |
|---|---|---|
| ACCELERATION AND DECELERATION MODE REGISTER | ACCELERATION | ~d01 |
| INFLECTION POINT REGISTER | SRAM addr 4 | ~d11 |
| INFLECTION POINT DESTINATION REGISTER | SRAM addr 262 | ~d21 |
| TARGET SPEED REGISTER | 2410 | ~d31 |

FIG. 13

| REGISTER SETTING | | |
|---|---|---|
| ACCELERATION AND DECELERATION MODE REGISTER | DECELERATION | ~d02 |
| INFLECTION POINT REGISTER | SRAM addr 277 | ~d12 |
| TARGET POINT DESTINATION REGISTER | SRAM addr 4 | ~d22 |
| INITIAL SPEED REGISTER | SRAM addr 15 | ~d32 |

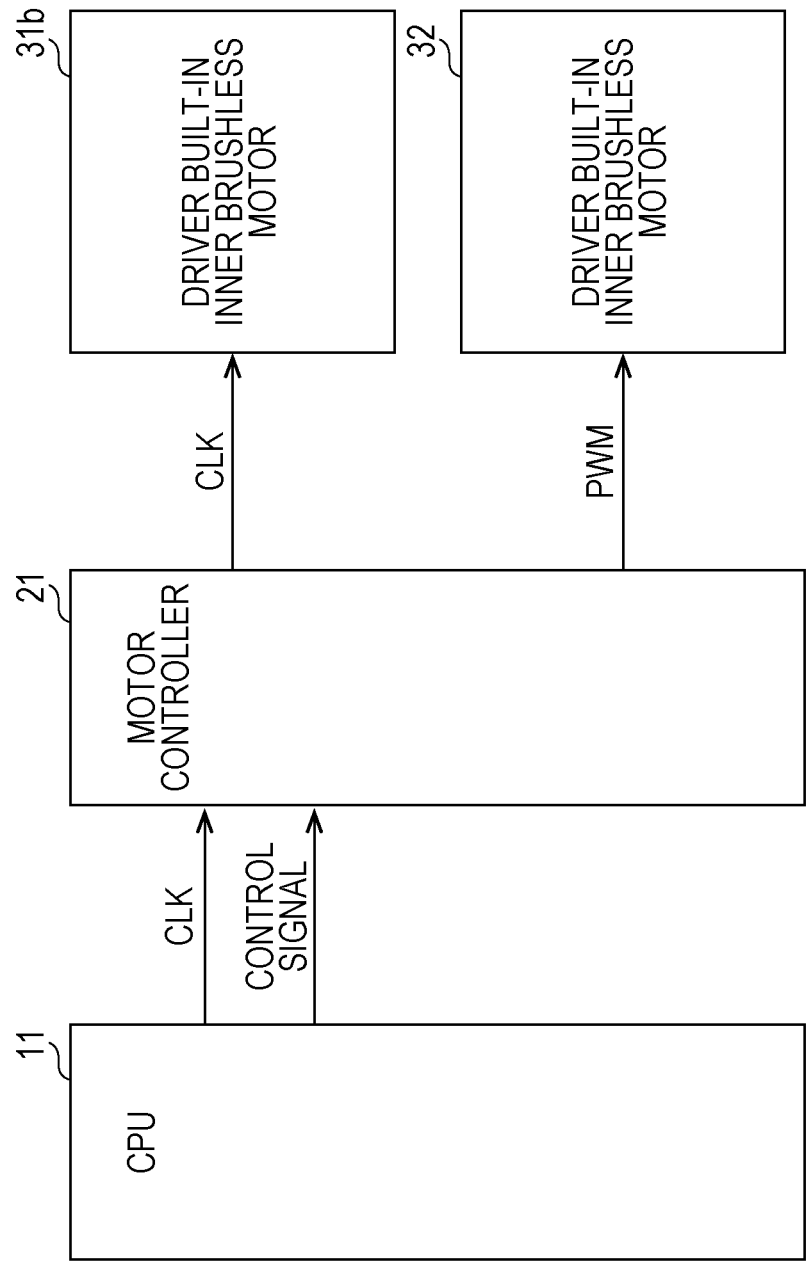

| | TABLE FOR STEPPING MOTOR | TABLE FOR BRUSHLESS MOTOR | STATE | |
|---|---|---|---|---|
| | STM [pps] | PWM [%] | | |
| T2 → | 0 | 0 | GRADUALLY INCREASE IN ACCELERATION (NON-LINEAR) | ← T4 |
| | 10 | 10 | | |
| | 11 | 11 | | |
| | 13 | 13 | | |
| | 16 | 16 | | |
| T1 → | 20 | 20 | PROPORTIONAL ACCELERATION (LINEAR) | ← T3 |
| | 25 | 50 | | |
| | 30 | 80 | | |
| T2 → | 34 | 84 | GRADUALLY DECREASE IN ACCELERATION (NON-LINEAR) | ← T4 |
| | 37 | 86 | | |
| | 39 | 89 | | |
| | 40 | 90 | | |

DRIVING DEVICE, IMAGE FORMING APPARATUS, AND CONTROL PROGRAM

The entire disclosure of Japanese patent Application No. 2018-118720, filed on Jun. 22, 2018, is incorporated herein by reference in its entirety.

BACKGROUND

Technological Field

The present invention relates to a driving device, an image forming apparatus, and a control program.

Description of the Related Art

In an image forming apparatus such as an electrophotographic printer, a conveyance roller for conveying a paper sheet is driven by a stepping motor. By using the stepping motor, accurate speed and position control can be performed with a simple control configuration.

Meanwhile, in recent years, along with an increase in a speed of the image forming apparatus, it has been required for reducing an acceleration time of the conveyance roller and increasing a target speed. However, an output torque of a general-purpose stepping motor used in the image forming apparatus is insufficient. Therefore, step out occurs, and the conveyance roller cannot be accelerated in a short time. Furthermore, in a case where an expensive stepping motor having a high torque is used, it is necessary to constantly flow an excessive current in order to secure a torque margin, and there has been a problem in that power consumption increases.

In relation to this, JP 2006-017988 A discloses a technique for coupling an output of a brushless motor to an output of a stepping motor at the time of activation, generating a torque in a driving line on the side of the stepping motor by the brushless motor, and subsequently performing driving by the stepping motor at the time of constant rotation.

In a case where the stepping motor in a stopping state is accelerated to a target speed, when control is immediately performed with a control clock of the target speed, a phenomenon called step out, in which rotation is locked, occurs. Therefore, in general, by gradually increasing the number of frequencies of the control clock, such a problem is prevented.

In relation to this, in JP 2002-259957 A, at the time of accelerating the stepping motor for driving a carriage of an image reading apparatus to the target speed, the frequency of the control clock is gradually increased, and when the speed reaches a reference speed A before the target speed, a constant portion (constant speed) of the control clock is provided. After that, when the speed reaches a reference speed B level due to a decrease in speed after overshoot, by increasing the frequency of the control clock to the target value again, the speed at the time of start of driving is stabilized.

However, with the technique disclosed in JP 2002-259957 A, there is a problem in that control is complicated because speed control is performed at each of a plurality of reference speeds. Furthermore, JP 2006-017988 A discloses the technique for coupling the output of the stepping motor to the output of the brushless motor at the time of activation. However, JP 2006-017988 A does not disclose stabilization control at the time of activation.

SUMMARY

The present invention has been made in consideration of the above. An object of the present invention is to provide a driving device and an image forming apparatus having excellent acceleration and deceleration characteristics in a case where a single rotation shaft of a conveyance roller is driven by two motors.

To achieve the abovementioned object, according to an aspect of the present invention, a driving device reflecting one aspect of the present invention comprises: a first motor that transmits power to a rotation shaft of a conveyance roller for conveying a paper sheet; a second motor that transmits power to the rotation shaft of the conveyance roller; and a motor controller that controls rotational speeds of the first and second motors by changing a control value, wherein the motor controller controls the control value of the first motor at multiple steps at a time of acceleration or deceleration and changes the control value of the second motor according to a change range of the control value of the first motor in synchronization with a timing when the control value of the first motor is changed.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIGS. 8A and 8B are diagrams illustrating a speed table for linear speed change and an acceleration table for non-linear speed change used at the time of acceleration and deceleration;

FIG. 11 is a diagram illustrating register setting at the time of acceleration control;

FIG. 13 is a diagram for illustrating register setting at the time of deceleration control;

FIG. 16 is a block diagram illustrating a configuration of a driving device according to a third embodiment.

DETAILED DESCRIPTION OF EMBODIMENTS

Figure 1:
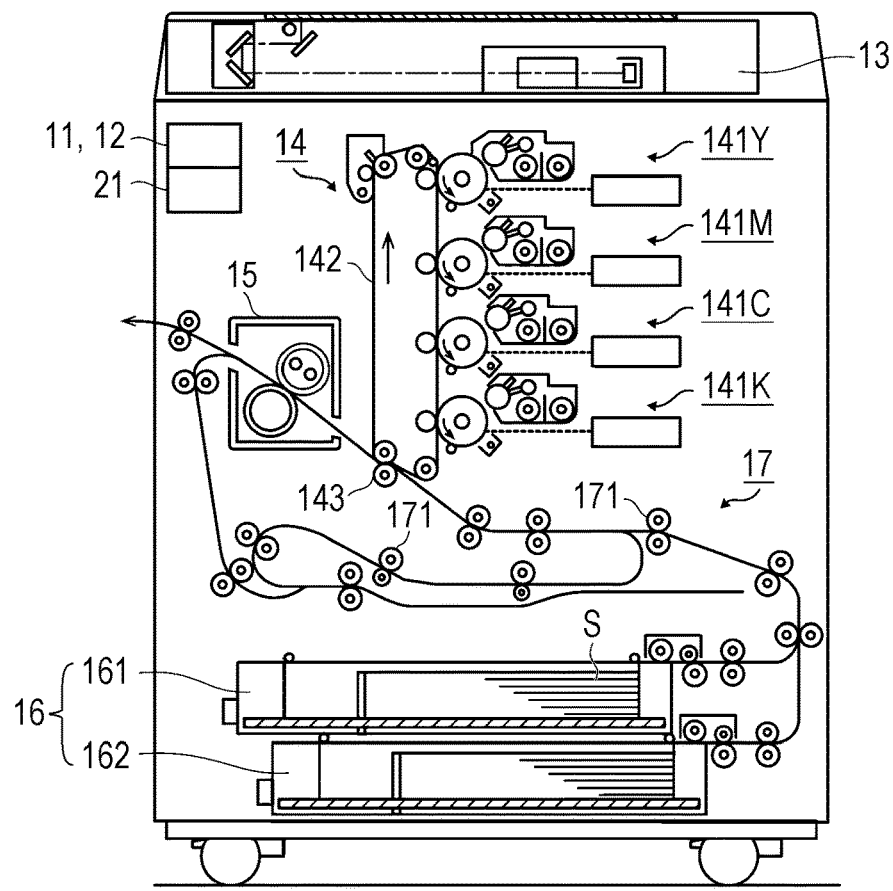
FIG. 1 is a cross-sectional diagram illustrating a schematic configuration of an image forming apparatus according to an embodiment of the present invention.

Hereinafter, one or more embodiments of the present invention will be described with reference to the drawings. However, the scope of the invention is not limited to the disclosed embodiments. The same elements in the description of the drawings are denoted with the same reference numeral, and overlapped description will be omitted. Furthermore, dimensional ratios of the drawings are exaggerated for convenience of description, and may be different from an actual ratio.

FIG. 1 is a cross-sectional diagram illustrating a schematic configuration of an image forming apparatus 10 according to an embodiment of the present invention. As illustrated in FIG. 1, the image forming apparatus 10 includes a controller 11, a storage 12, an image reader 13, an image former 14, a fixer 15, a paper feeder 16, and a paper sheet conveyer 17.

The controller 11 includes a central processing unit (CPU) and controls each part and performs various calculation processing according to a program.

The storage 12 includes a read only memory (ROM) for storing various programs and various data in advance, a random access memory (RAM) for temporarily storing programs and data as a work area, a hard disk for storing various programs and various data, and the like.

The image reader 13 includes a light source such as a fluorescent lamp and an imaging device such as a charge coupled device (CCD) image sensor. The image reader 13 emits light from the light source to a document set at a predetermined read position, photoelectrically converts reflected light by the imaging device, and generates image data from an electric signal.

The image former 14 includes developing units 141Y to 141K corresponding to toners of respective colors including yellow (Y), magenta (M), cyan (C), and black (K). Toner images formed through processes of charge, exposure, and development by the developing units 141Y to 141K are sequentially superimposed on an intermediate transfer belt 142 and transferred on a paper sheet S by a secondary transfer roller 143.

The fixer 15 includes a heating roller and a pressure roller and heats and pressurizes the paper sheet S conveyed by fixing nips of both rollers, and melts and fixes the toner image on the paper sheet S on a surface of the paper sheet S.

The paper feeder 16 includes a plurality of paper feeding trays 161 and 162 and feeds the paper sheets S housed in the paper feeding trays 161 and 162 to a conveyance path on the downstream side one by one.

The paper sheet conveyer 17 includes a plurality of conveyance rollers 171 for conveying the paper sheet S and conveys the paper sheet S between the image former 14, the fixer 15, and the paper feeder 16. All or a part of the plurality of conveyance rollers 171 are driven by a driving device 20 (refer to FIG. 2).

Figure 2:
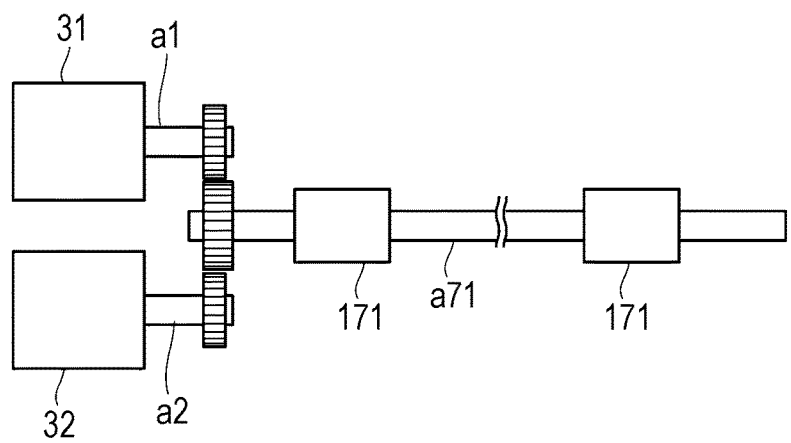
FIG. 2 is a schematic diagram illustrating a schematic configuration of a driving device according to a first embodiment.

Next, the driving device 20 for driving the conveyance rollers 171 will be described with reference to FIGS. 2 and 3. FIG. 2 is a schematic diagram illustrating a schematic configuration of the driving device 20 according to a first embodiment, and FIG. 3 is a block diagram illustrating a configuration of the driving device 20.

Figure 3:
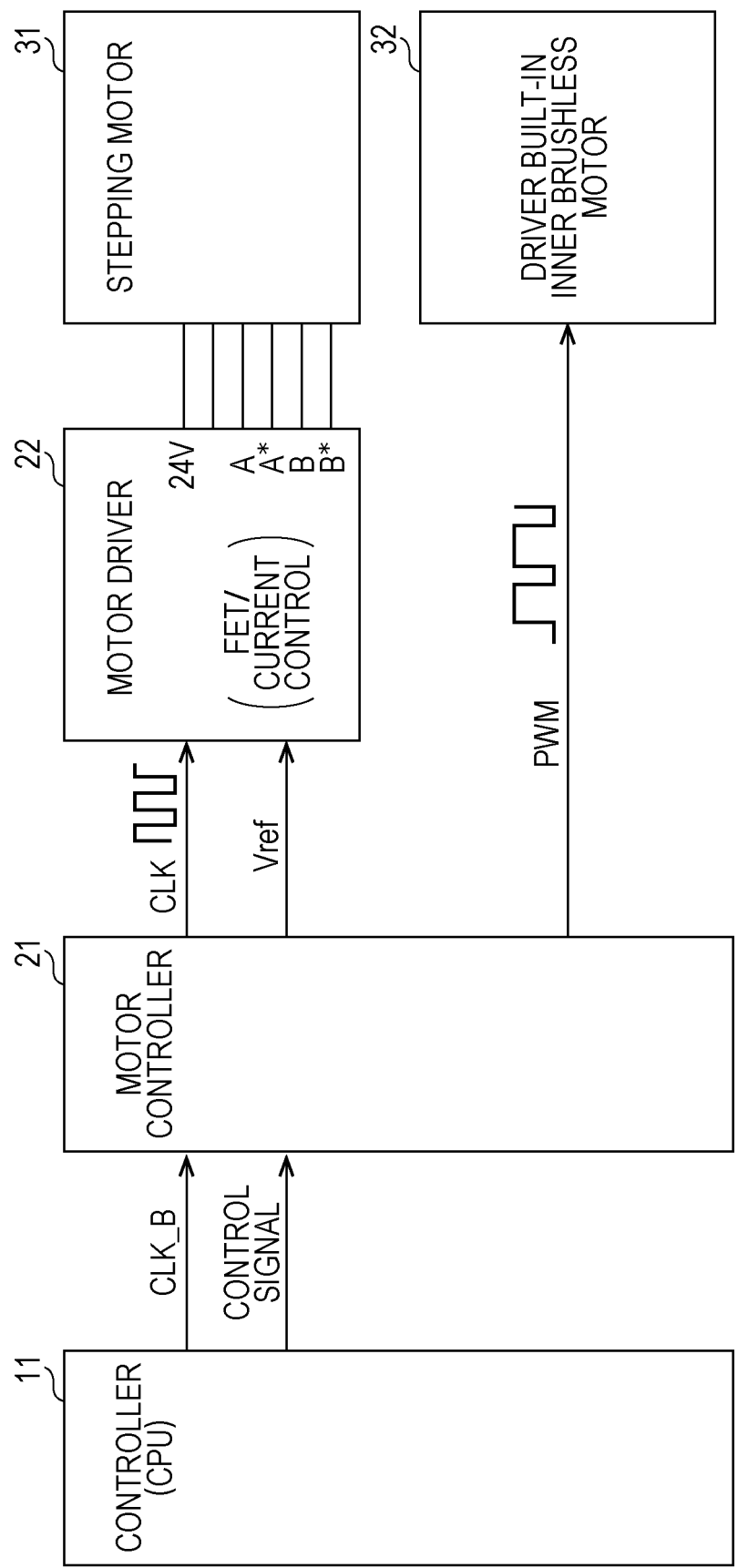
FIG. 3 is a block diagram illustrating a configuration of the driving device.

As illustrated in FIGS. 2 and 3, the driving device 20 includes the controller 11, a motor controller 21, a motor driver 22, a stepping motor 31, and a driver built-in inner DC brushless motor 32 (simply referred to as "brushless motor 32" below). The stepping motor 31 and the brushless motor 32 respectively include rotation shafts a1 and a2, and a gear is attached to an end of each of the rotation shafts a1 and a2.

The stepping motor 31 that is a "first motor" is coupled to a rotation shaft (driving shaft) a71 of the conveyance roller 171 via the plurality of gears (single gear is illustrated) so as to transmit power to the rotation shaft a71. Furthermore, the brushless motor 32 that is a "second motor" is coupled to the rotation shaft a71 of the conveyance roller 171 via the plurality of gears so as to transmit power to the rotation shaft a71. In this way, the two motors 31 and 32 are formed to rotate the single rotation shaft a71 of the conveyance roller 171. In FIGS. 2 and 3, the single driving device 20 is illustrated. However, the motor controller 21, the motor driver 22, the stepping motor 31, and the brushless motor 32 may be arranged so as to correspond to each of the plurality of conveyance rollers 171. In this case, the single controller 11 controls driving of a plurality of sets of motors 31 and 32 via the plurality of motor controllers 21.

The motor controller 21 drives the stepping motor 31 by open loop control. Specifically, the motor controller 21 controls a rotational speed of the stepping motor 31 by transmitting a clock signal (CLK) set as a control value to the motor driver 22 for the stepping motor 31. Furthermore, the motor controller 21 transmits a setting current signal (Vref) to the motor driver 22 and sets a current value of the stepping motor 31 so as to control a torque generated in the stepping motor 31.

The motor controller 21 outputs a pulse width modulation (PWM) signal to a built-in driver of the brushless motor 32 and sets a control value of the brushless motor 32 so as to control a rotational speed of the brushless motor 32. This control value is a PWM duty value (also referred to as duty ratio) and may take a value in a range of zero to 100%. Furthermore, the motor controller 21 performs speed feedback control of the brushless motor 32 by receiving a rotational speed signal from a built-in encoder of the brushless motor 32 (not shown).

(Motor Controller 21)

Figure 4:
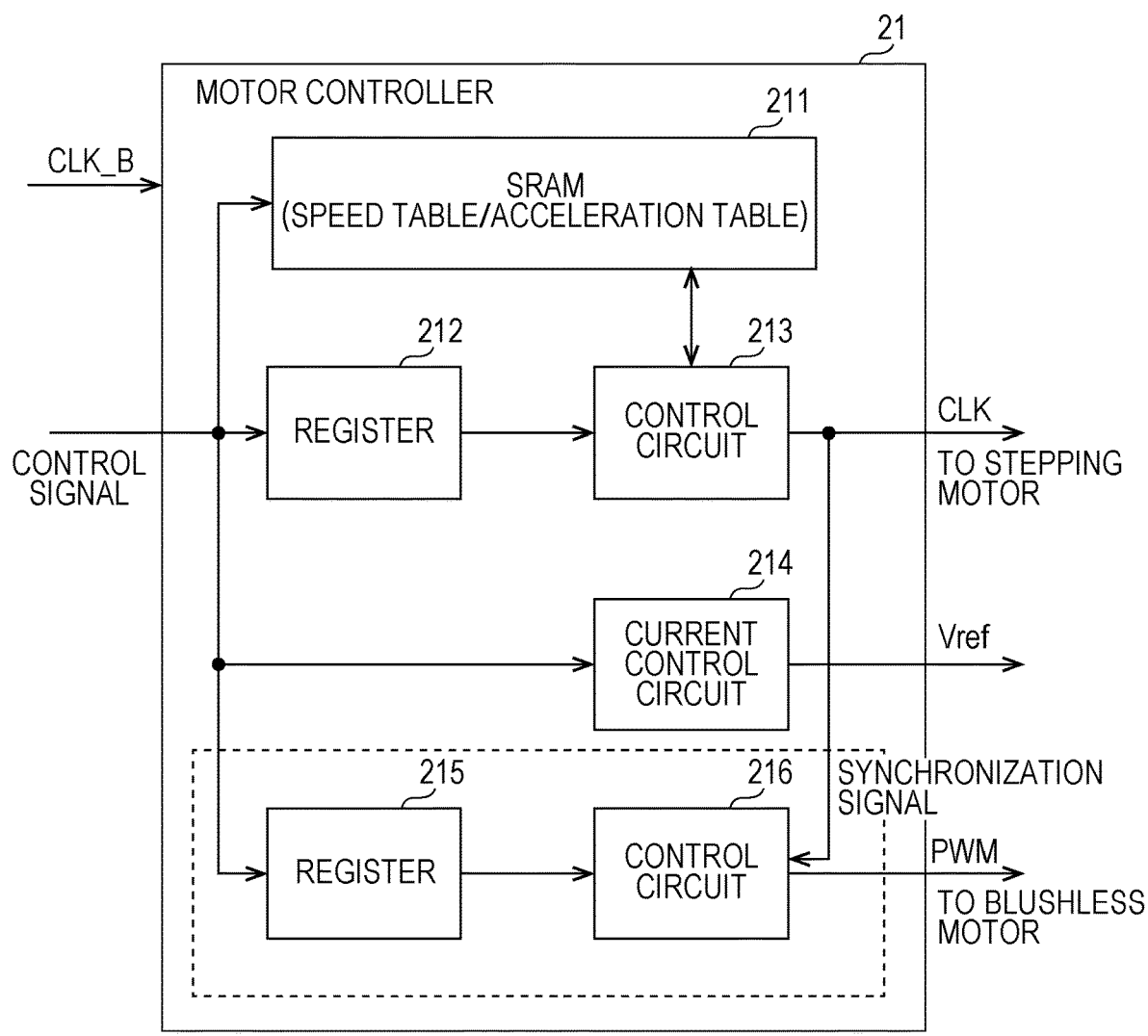
FIG. 4 is a block diagram illustrating a hardware configuration of a motor controller.

FIG. 4 is a block diagram illustrating a hardware configuration of the motor controller 21. The motor controller 21 includes a static RAM (SRAM) 211, a register 212, a control circuit 213, a current control circuit 214, a register 215, and a control circuit 216.

The motor controller 21 receives a reference clock (CLK_B) and a control signal from the controller 11. The reference clock is generated by an oscillator (not shown), and for example, a frequency of the reference clock is 30 MHz. The reference clock is used as a counting reference cycle of a timer to be described later.

The SRAM 211 stores a plurality of tables used for speed control. The tables include a table for storing a continuous speed change (linear speed change) (absolute value of speed) (referred to as "speed table" below) and a table for storing a change of acceleration (change rate of speed) (referred to as "acceleration table" below). Both tables are used at the time of acceleration and deceleration (at the time of acceleration or deceleration). The table includes link destination address information and a table value. Physical address information of the SRAM 211 to be executed in the next step is stored in the address information. An example of the table will be described later.

The register 212 is set by the controller 11 and plays a role of a register for specifying an inflection point of the speed table, a register for specifying a start address of the acceleration table, a register for selecting acceleration or deceleration, and a register for setting a target speed. An example of data to be stored in the register 212 will be described later.

The control circuit 213 generates a clock signal for controlling rotation of the stepping motor 31. The control circuit 213 reads a counter value according to a wavelength (clock frequency) from the speed table, sets the read counter value to a counter, and outputs a clock signal according to the counter value. Specifically, the control circuit 213 counts up a timer at the reference cycle and inverts logic of the clock signal when the counted value reaches the counter value. In the following embodiments, this processing is performed twice relative to the signal counter value (single cycle of ON/OFF of clock signal). However, the present invention is not limited to this, and the processing may be executed once for each counter value. Furthermore, the control circuit 213 has an arithmetic function for reading an acceleration value of the acceleration table, for calculating a speed at the next step based on the read acceleration value and the speed at the previous step, and for calculating a counter value corresponding to the speed.

The current control circuit 214 controls a torque of the stepping motor 31. The current control circuit 214 generates a setting current signal (Vref) according to the input control signal and outputs the generated signal to the motor driver 22.

The register 215 and the control circuit 216 respectively have similar functions to those of the register 212 and the control circuit 213. The registers and the control circuits output the PWM signals to the brushless motor 32 and control the number of rotations. The control circuit 216 receives a timing signal (logic inversion timing of clock signal) from the control circuit 213 and changes a duty value of the PWM signal in synchronization with the timing signal.

(Speed Control)

Here, problems in the related art will be described before the description on the speed table and the acceleration table.

Figure 5:
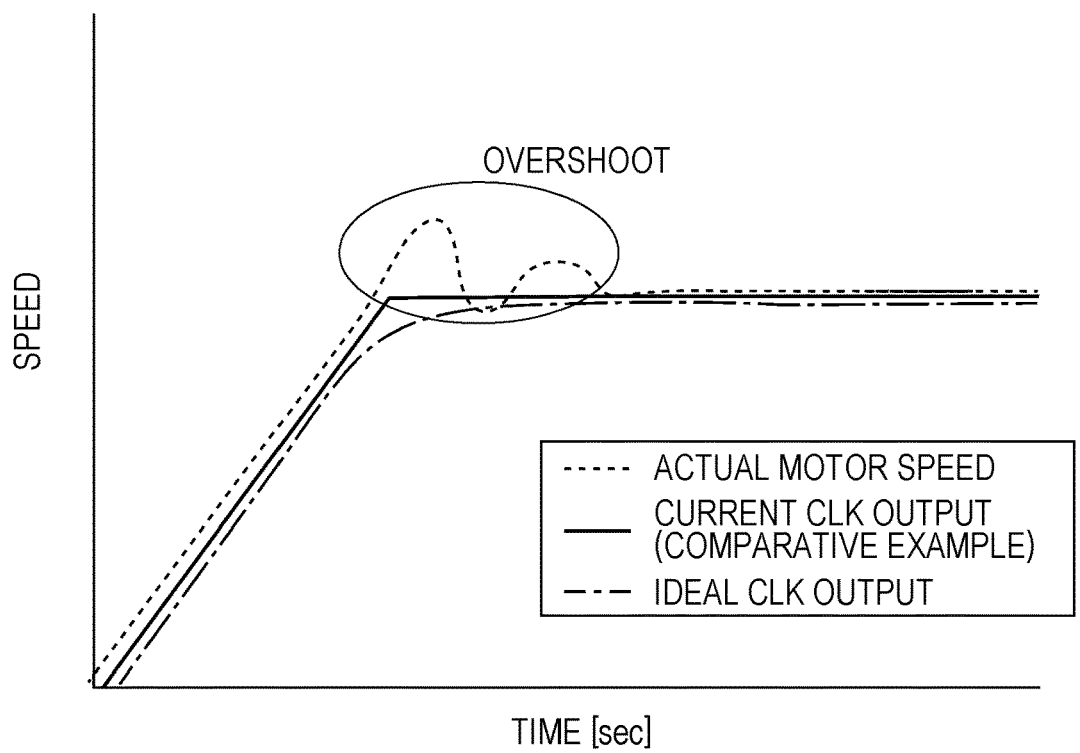
FIG. 5 is a diagram for explaining an overshoot of a rotational speed at a time of accelerating a stepping motor in the related art.
Figure 6:
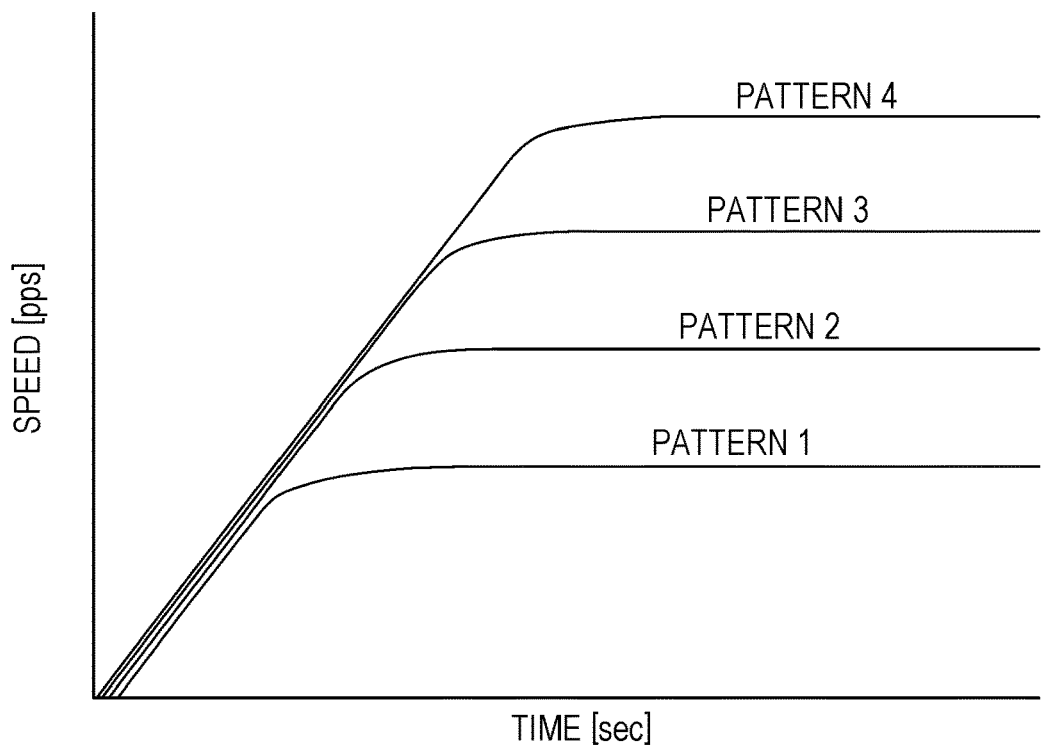
FIG. 6 is a conceptual diagram illustrating a plurality of acceleration tables for each of a plurality of target speeds in the related art.

FIG. 5 is a diagram illustrating an overshoot of a rotational speed at a time of acceleration of the stepping motor in the related art. FIG. 6 is a conceptual diagram illustrating a case where the plurality of acceleration tables is prepared for each of the plurality of target speeds in the related art.

The stepping motor cannot be activated at a target speed from the beginning. If the speed does not gradually increase so as to reach a stable speed, a phenomenon called "step out" in which the rotation is locked occurs. Therefore, it is necessary to perform control for gradually reducing rising intervals of the clock signal input to the stepping motor, that is, control for gradually increasing a frequency of the clock signal. There are mainly two methods for performing the acceleration control. (1) A first method is a method for subtracting an interval of the clock signals at the time of rising of the clock signal at constant acceleration to achieve acceleration. (2) A second method is a method for storing an interval of the clock signals in a memory in advance as the table value and changing the interval of the clock signals by clock signal units. Since calculation is performed in the method (1), the speed increases linearly with constant acceleration. Therefore, fine control cannot be performed. On the other hand, since the speed can be set as an arbitrary curve in the method (2), an acceleration curve can be flexibly controlled. However, it is necessary for holding a control table in advance, and a memory source is needed. In general, with the method (1), the acceleration is performed by calculation by hardware, and with the method (2), the acceleration control is realized by rewriting (sequential setting) of a timer value by software.

However, in recent years, acceleration in paper sheet conveyance has been required. Therefore, when it is required that the acceleration curve is set as constant acceleration (linear) with the calculation method (1) and the speed is stabilized at the target speed, a speed overshoot of the stepping motor occurs. With this overshoot, a difference between the target speed and the clock signal is caused, and the step out may occur depending on the degree of the difference. In FIG. 5, a relation between an output of the clock signal and an actual motor speed is illustrated.

As a method for solving the above problems, a method is considered in which the control for performing the acceleration with the constant acceleration is continued to a speed almost close to the target speed and the acceleration is gradually reduced when the speed is close to the target speed. In FIG. 5, an "ideal" control curve (CLK output) is illustrated. To realize the ideal curve, it is necessary to use the table method in (2).

However, in a case where the curve pattern is realized with the table method, there are the following two problems.

The first problem is an increase in a memory capacity. In recent years, the image forming apparatus 10 has been required to deal with various paper sheets. Therefore, it is difficult to deal with all the kinds of paper sheets with the same linear speed (conveyance speed of paper sheet), and there is a case where the paper sheet conveyance speed is set at a plurality of steps. For example, in a case of thick paper, the paper sheet conveyance speed is made to be slower than a conveyance speed of normal paper according to a basis weight. FIG. 6 is a conceptual diagram illustrating a plurality of acceleration tables for each of the plurality of target speeds according to the paper sheet. In this way, it is necessary for preparing a plurality of patterns of tables corresponding to the plurality of conveyance speeds, and a problem occurs in that the memory capacity increases.

The second problem is limit of a CPU processing performance. To enhance a control performance of an accelerated conveyer, 10 or more, for example, 20 stepping motors are required. However, in a case where the table method is employed, it is necessary for performing interrupt processing for rewriting a timer value at each rising of the clock signal. In a state where real-time processing is required, the number of motors that can be concurrently processed is limited.

Figure 7:
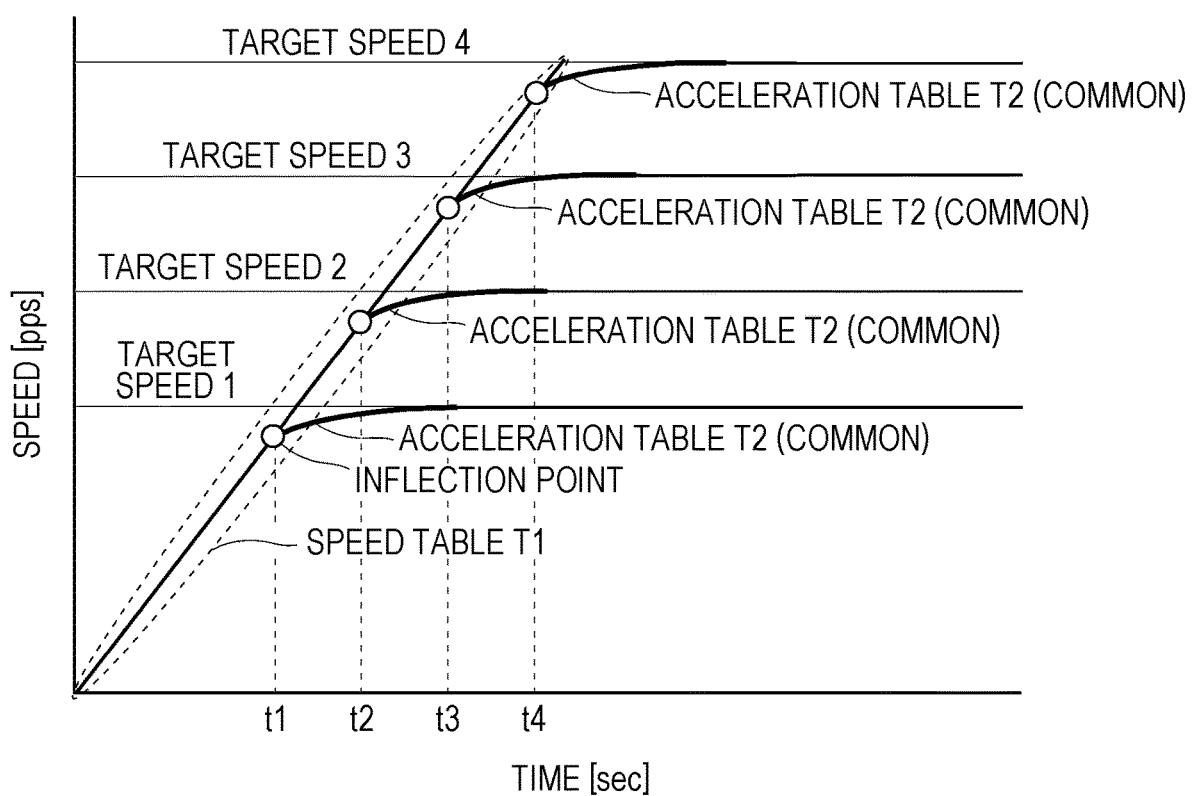
FIG. 7 is a conceptual diagram illustrating application ranges of a speed table and an acceleration table according to the present embodiment.

To solve the above problems, the following countermeasures are taken in the present embodiment. FIG. 7 is a conceptual diagram illustrating application ranges of a speed table T1 and an acceleration table T2. With respect to the first problem (increase in memory capacity), a single speed table T1 is commonly used for a constant acceleration (linear) portion as illustrated in FIG. 7. Furthermore, the inflection point is set in the vicinity (slightly before) of each target speed, and the speed after the inflection point is changed according to the common acceleration table T2 (specific examples of speed table T1 and acceleration table T2 will be described later). Accordingly, in a case where it is required to cope with a plurality of conveyance speeds, the increase in the memory capacity can be suppressed.

To solve the second problem (limitation of CPU performance), a hardware circuit illustrated in FIG. 4 is applied.

With this application, by performing the interrupt processing on the CPU by the hardware circuit, a load of the CPU can be reduced.

FIGS. 8A and 8B are diagrams illustrating a speed table for linear speed change and an acceleration table for non-linear speed change used at the time of acceleration and deceleration. FIG. 8A is a speed table T1 for the stepping motor 31, and FIG. 8B is an acceleration table T2 for the stepping motor 31. In FIGS. 8A and 8B, a speed table T3 and an acceleration table T4 for brushless motor are partially illustrated in rightmost columns of the respective tables. In the speed table T3, display of columns of a physical address ("SDRAM addr") and a next address ("next addr") is omitted. However, the speed table T3 has a similar structure to the speed table T1. The same applies to the acceleration table T4. The tables T1 to T4 respectively correspond to a "first to fourth tables".

In the examples in FIGS. 8A and 8B, in the speed table T1, an absolute value of the counter value according to the interval (wavelength) of the clock signal is described ("speed data"). In the acceleration table T2, a change rate of the counter value is described. In the speed table T3, an absolute value of the duty value corresponding to the speed table T1 is described. In the acceleration table T4, a change rate of the duty value corresponding to the acceleration table T2 is described. Furthermore, a change range between elements adjacent to each other in the speed table T1 is set to be substantially the same as a change range between elements adjacent to each other in the speed table T3. The counter value and the duty value are "control values" of each motor. With these control values, the rotational speed of each motor is controlled.

A counter value "2147" relative to the stepping motor 31 and a duty value "60%" in a PWM table in the lowermost row in FIG. 8A indicate the same design rotational speed. Furthermore, a change range between the rotational speeds of the stepping motor 31 with the counter value "2147" and a counter value "2201" next to the counter value "2147" is substantially the same as a change range between the rotational speeds of the brushless motor 32 with the duty value "60%" and a duty value "57%".

The acceleration table T4 corresponds to the acceleration table T2. In the acceleration table T4, the change rate of the duty value is described. Note that the tables are not limited to this, and the change rate may be described in the speed table T3, and the absolute value may be described in the acceleration table T4.

Furthermore, as a further modification, it is possible that a speed at the time of start of acceleration, the target speed, and the maximum value and the minimum value of the PWM duty value relative to the above values are held by the register without providing the speed table T3 and a change amount of the duty value is calculated from a ratio of a change amount for one step in the speed table T1 relative to the entire change amount. For example, in FIG. 8A, if an initial speed is "13332", the target speed is "2147", and the minimum value of the PWM duty value relative to these values is zero %, and the maximum value is 60%, the minimum value and the maximum value of the duty value are calculated by interpolation from the ratio relative to the entire change amount.

(Output of Clock Signal Using Counter Value)

Figure 9:
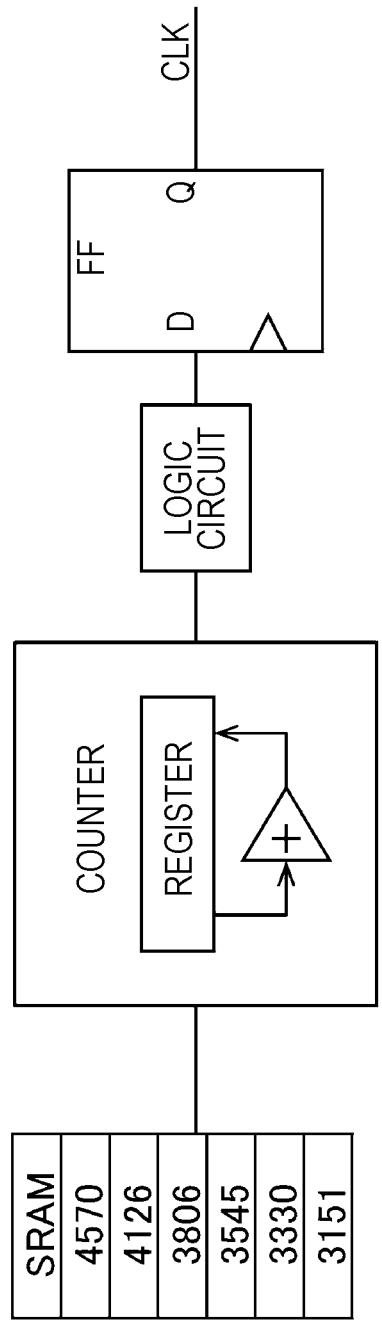
FIG. 9 is a conceptual diagram illustrating a circuit operation related to an output of a clock signal.

FIG. 9 is a conceptual diagram illustrating a circuit operation (timer function) of the control circuit 213 related to an output of the clock signal. In a case where the speed table T1 stored in the SRAM 211 is used, the counter value stored in each address is read. Then, this is set to the counter. For example, a counter value "4570" is set to the counter. Then, this is counted at a cycle (reference cycle) of the reference clock (for example, 30 MHz), and in a case where counting for the number of times of the counter value (4570 times) is performed, the logic of the clock signal is inverted. In the present embodiment, in this counting, counting-up is performed to the counter value at the reference cycle. However, the present invention is not limited to this, and counting-down may be performed from the counter value to zero.

(Drive Control)

Figure 10A:
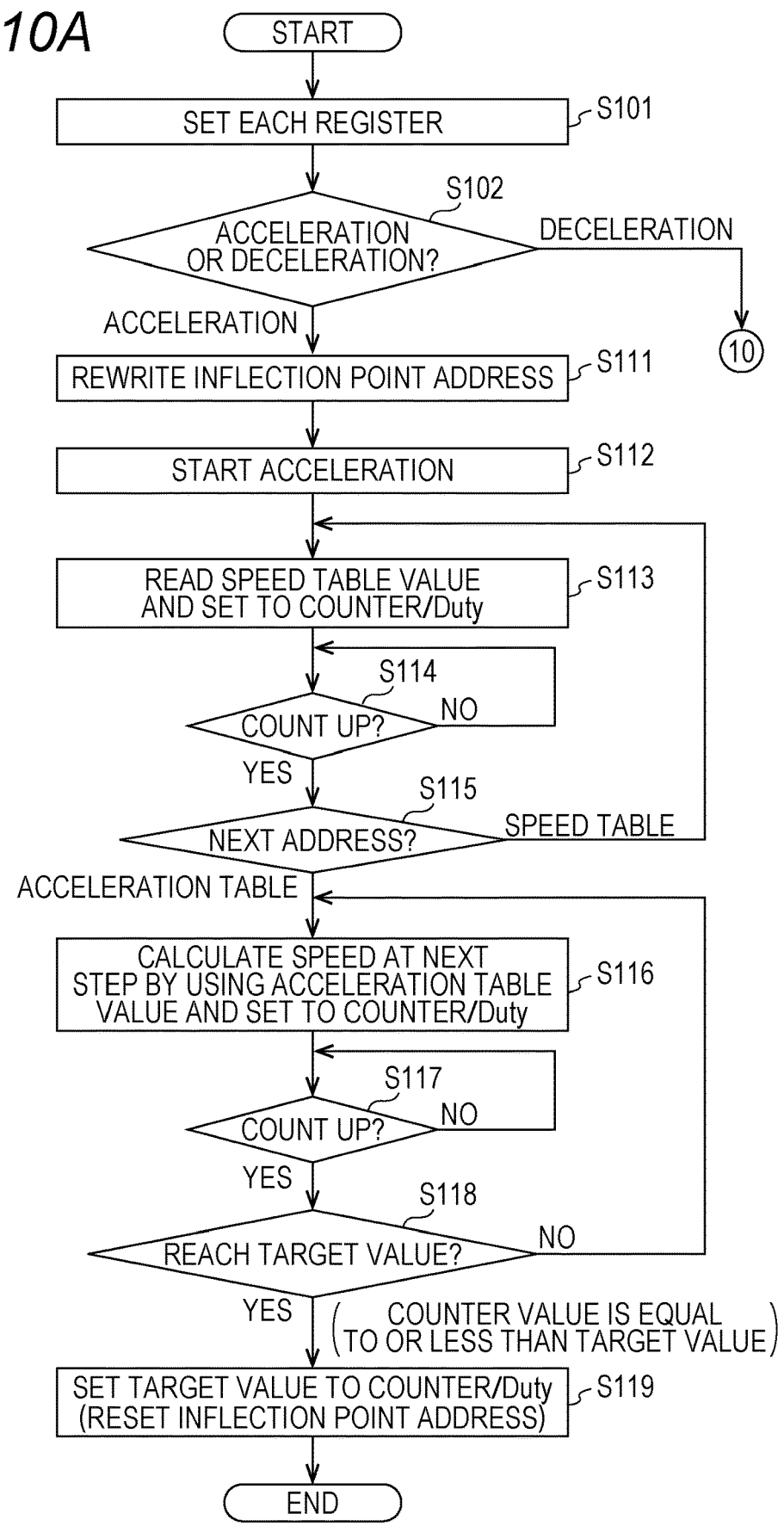
FIG. 10A is a flowchart illustrating a procedure of drive control executed by the motor controller.
Figure 10B:
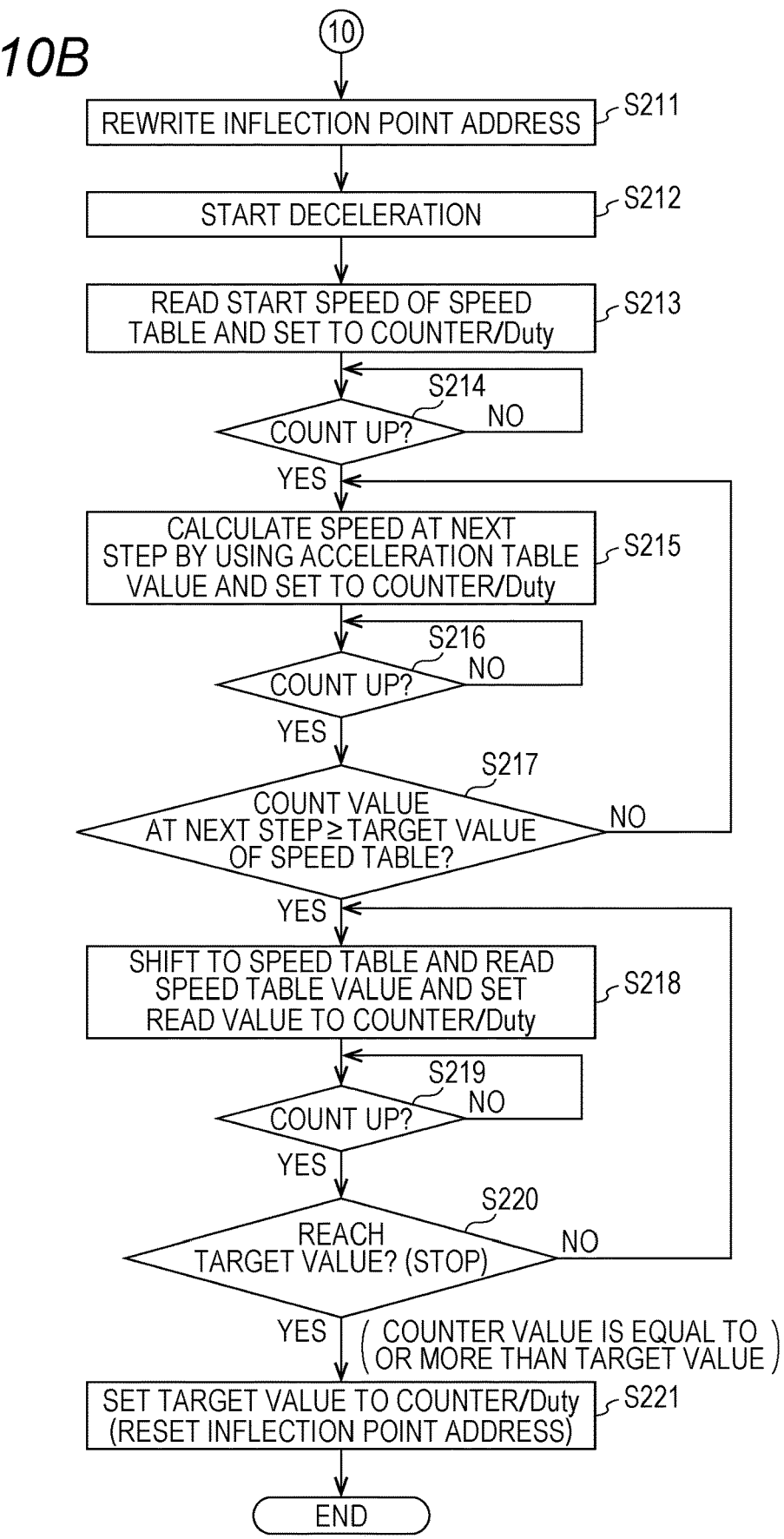
FIG. 10B is a flowchart illustrating the procedure of the drive control subsequent to FIG. 10A.

Next, drive control of the driving device 20 for driving the conveyance roller 171 according to the present embodiment will be described with reference to FIGS. 10A and 10B. FIG. 10A is a flowchart illustrating a procedure of drive control executed by the controller 11 and the motor controller 21, and FIG. 10B is a flowchart illustrating the procedure subsequent to FIG. 10A.

(Step S101)

The controller 11 sets data to the registers 212 and 215. FIG. 11 is an example of register setting for the stepping motor 31 set to the register 212. This is set according to a basis weight of a paper sheet to be used, for example, when execution of a print job is started. Although the description is omitted, data for the brushless motor 32 is set to the register 215. The controller 11 determines an inflection point according to a current speed and a target speed and sets the register 212 according to the inflection point.

(Step S102)

The motor controller 21 refers to the register setting set in step S101 and determines whether or not acceleration or deceleration is performed. When the deceleration control is performed, the procedure proceeds to step S211 in FIG. 10B. On the other hand, in a case of the register setting (d01: "acceleration") as illustrated in FIG. 11, the procedure proceeds to step S111, and the acceleration control is performed.

(Acceleration Control)

(Step S111)

Figure 12:
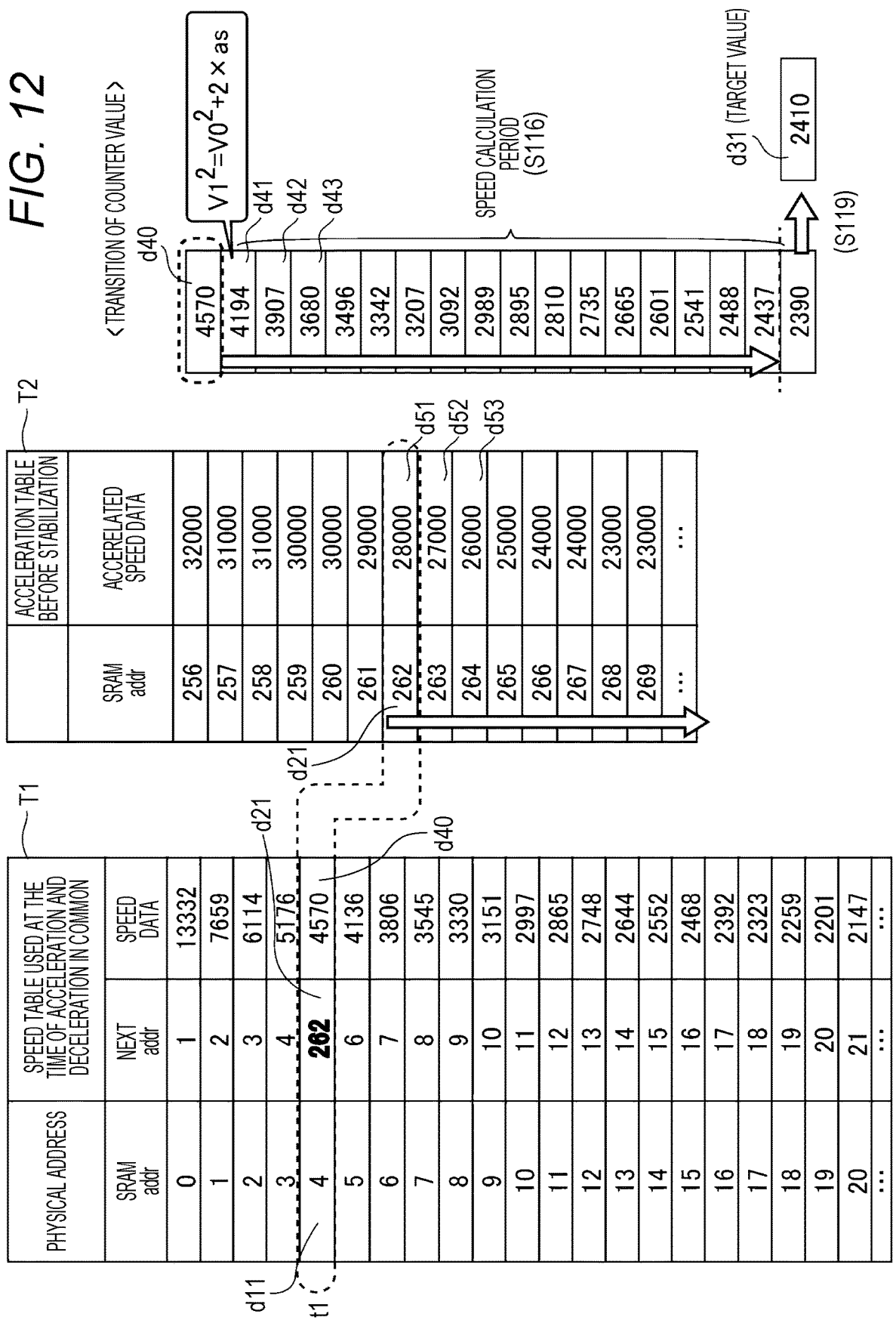
FIG. 12 is a diagram for explaining transition of a counter value at the time of the acceleration control.

The motor controller 21 rewrites an inflection point address. FIG. 12 is a diagram for explaining transition of the counter value (control value) at the time of the acceleration control. FIG. 12 corresponds to FIGS. 8A and 8B. With the processing in step S111, an address in the speed table T1 corresponding to the inflection point address is rewritten (bold letters in a region indicated by a dotted line) based on values d11 and d21 in the register setting in FIG. 11. In FIG. 7, a speed at a time t1 corresponds to a counter value at this inflection point address, and a "target speed 1" in FIG. 7 corresponds to the counter value "2410" in a target speed register. In FIG. 12, descriptions of the acceleration tables T2 and T4 regarding the PWM signal of the brushless motor 32 are omitted.

(Step S112)

Based on a trigger signal generated by the controller 11, the motor controller 21 activates the stepping motor 31 and the brushless motor 32 and starts acceleration.

(Step S113)

The motor controller 21 reads values from the speed tables T1 and T3 and sets the counter value and the duty value. Specifically, a counter value "13332" at an address zero of the SRAM 211 in FIG. 12 (refer to FIG. 9) is set to the counter, and counting up is performed to the counter value at the reference cycle. Furthermore, the control circuit 216 sets a duty value (zero %) corresponding to the counter value "13332" as a control value to the brushless motor 32. At this time, the control circuit 213 is synchronized with the control circuit 216. That is, the control circuit 216 changes (set) the duty value in synchronization with a timing for when the control circuit 213 changes (set) the counter value.

(Step S114)

In a case where the control circuit 213 has performed the counting up to the counter value (YES), the procedure proceeds to step S115.

(Step S115)

The motor controller 21 determines whether the next address ("next addr" in speed table T1 in FIG. 12) is set to the speed table T1 or the acceleration table T2. For example, in a case where a counter value "5176" in the fourth row of the speed table T1 is set to the counter and counting up is performed, an address to be referred next is "4". Therefore, the next address is set in the speed table T1. In this case, the procedure returns to step S113. On the other hand, in a case where a counter value "4570" in the fifth row is set to the counter and counting up is performed, an address to be referred next is "262. Therefore, the next address is set in the acceleration table T2. In this case, the procedure proceeds to step S116.

(Step S116)

According to the following procedure, the motor controller 21 calculates a control value (rotational speed) of a next step using the acceleration table T2 and sets the calculated value to the counter and the duty value.

An example of transition of control of the counter value is illustrated in a table at the right end in FIG. 12. A counter value immediately before is the counter value in the speed table T1 (d40: 4570), and a next counter value (d41: 4194) is calculated based on the counter value above and an acceleration value (d51: 28000) stored in the address 262 in the acceleration table T2.

$$V1^2 = V0^2 + 2as \quad \text{Expression (1)}$$

Specifically, a counter value to be the value V1 that satisfies the above Expression (1) is calculated. Here, the value V0 is an immediately preceding rotational speed (corresponding to d40), and the value as is an acceleration (corresponding to d51). The value V1 is a rotational speed corresponding to a next counter value d41.

In the acceleration table T2, an address of an acceleration value d51 to be referred is shifted one by one in a direction indicated by an arrow. For example, a counter value d42 is calculated by using the counter value d41 and the acceleration value d52, and a counter value d43 is calculated by using the counter value d42 and an acceleration value d53.

(Step S117)

In a case where the control circuit 213 has performed the counting up to the counter value (YES), the procedure proceeds to step S118.

(Step S118)

The motor controller 21 determines whether or not the speed calculated in step S116 has reached a target value. The target value is described in a target speed register (d31: 2410) as illustrated in FIG. 11. In a case of a value equal to or less than the target value (YES), that is, the current counter value is equal to or less than the counter value in the target speed register (equal to or faster than target speed), the procedure proceeds to step S119. In a case where the value still exceeds the target value (NO), the procedure is returned to step S116.

In the example in FIG. 12, if the counter value calculated in step S116 is "2390", since the counter value is equal to or less than the counter value "2410" in the target speed register, the procedure proceeds to step S119.

(Step S119)

The motor controller 21 sets the counter value "2410" that is a target value to the counter. Furthermore, a duty value corresponding to the counter value is set. In addition, at this time, the inflection point address in the speed table T1 and the like is reset.

The acceleration control processing is terminated as described above. Subsequently, until the motor controller 21 receives a next instruction from the controller 11, the motor controller 21 repeatedly puts the counter value "2410" in the counter and continues the rotations of the stepping motor 31 and the brushless motor 32 at the target speed (paper sheet conveyance speed) corresponding to the counter value.

(Deceleration Control)

Next, the deceleration control will be described with reference to FIG. 10B. If the register setting set in step S101 is register setting (d02: "deceleration") as illustrated in FIG. 13, the deceleration control in and after step S211 will be performed.

(Step S211)

Figure 14:
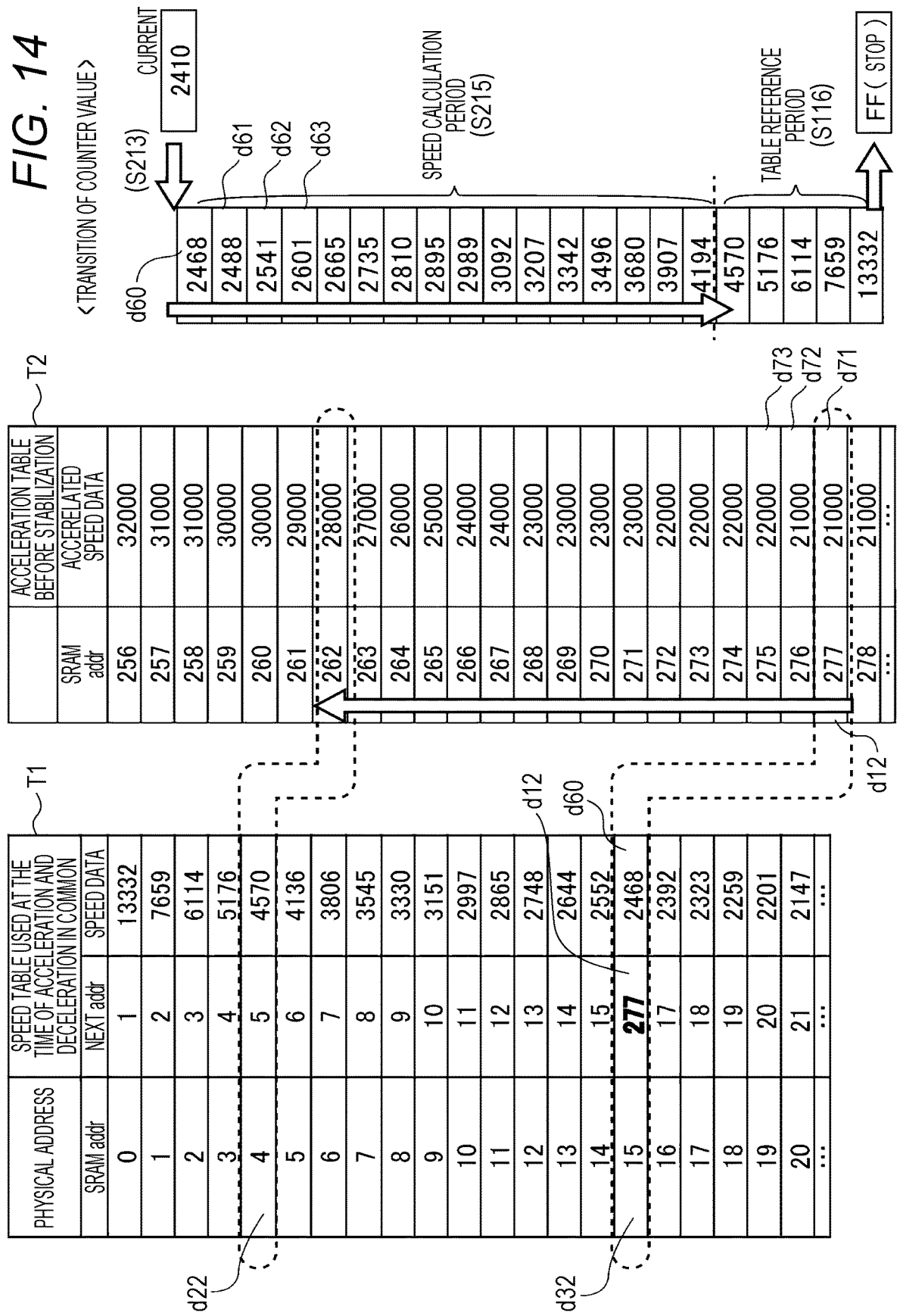
FIG. 14 is diagram for explaining transition of a counter value at the time of the deceleration control.

The motor controller 21 rewrites an inflection point address as in step S111. FIG. 14 is a diagram for explaining transition of the counter value (control value) at the time of the deceleration control. FIG. 14 corresponds to FIGS. 8A and 8B and FIG. 12. According to the processing in step S211, an address in the speed table T1 is rewritten (bold letters in a region indicated by a dotted line) based on values of d12 and d32 in the register setting in FIG. 14. Here, as in FIG. 12, the descriptions of the acceleration tables T2 and T4 regarding the PWM signal of the brushless motor 32 will be omitted.

(Step S212)

The motor controller 21 starts the deceleration.

(Step S213)

The motor controller 21 reads a start speed table of the speed table and sets the read value to the counter and the duty value. In the example in FIG. 15, the counter value "2410" before that time is changed (set) to the counter value (d60: 2468) in the speed table T1 that is the start speed and the duty value corresponding to the counter value.

(Step S214)

In a case where the control circuit 213 has performed the counting up to the counter value (YES), the procedure proceeds to step S215.

(Step S215)

The motor controller 21 calculates a control value at a next step using the acceleration tables T2 and T4 and sets the calculated value to the counter value and the duty value.

The transition of the counter value is illustrated in a table at the right end in FIG. 14. A counter value immediately before is the counter value in the speed table T1 (d60: 2468) as described above, and a next counter value (d61: 2488) is calculated based on the counter value above and an acceleration value (d71: 21000) stored in an address 277 in the acceleration table T2.

$$V1^2 = V0^2 - 2as \quad \text{Expression (2)}$$

Specifically, a counter value to be the value V1 that satisfies the above Expression (2) is calculated. Here, the value V0 is an immediately preceding rotational speed (corresponding to d60), and the value as is an acceleration (corresponding to d71). The value V1 is a rotational speed corresponding to a next counter value d61.

In the acceleration table T2, an address of an acceleration value d71 to be referred is shifted one by one in a direction indicated by an arrow. For example, a counter value d62 is calculated by using the counter value d61 and the acceleration value d72, and a counter value d63 is calculated by using the counter value d62 and an acceleration value d73.

(Step S216)

In a case where the control circuit 213 has performed the counting up to the counter value (YES), the procedure proceeds to step S217.

(Step S217)

The motor controller 21 determines whether or not a speed at a next step reaches a target value of a speed table. By processing same as step S215, a control value (rotational speed) at the next step is calculated by using the acceleration table T2. Then, the calculation result is compared with the target value of the speed table. The target value is a counter value "4570" of the speed table T1 in FIG. 14 corresponding to an address 4 described in a target point destination register d22 in FIG. 13. In a case of a value equal to or more than the target value (YES), that is, the counter value at the next step calculated in this step is equal to or more than the target value (equal to or less than target speed), the procedure proceeds to step S218. In a case where the value is still less than the target value (NO), the procedure is returned to step S215. In a case where the procedure is returned to step S215, the counter value at the next step calculated in this step may be applied to step S215.

(Step S218)

The motor controller 21 shifts a reference destination from the acceleration table T2 (T4) to the speed table T1 (T3). Then, the speed tables T1 and T3 are read, and the counter and the duty value are set. In the example in FIG. 14, an address order is reversed so as to sequentially read counter values from the counter value "4570" at the address 4 to the counter value "13332" at the address 0.

(Step S219)

In a case where the control circuit 213 counts up to the counter value (YES), the procedure proceeds to step S220.

(Steps S220 and S221)

The motor controller 21 performs the deceleration control with reference to the speed table T1 (T3) until the value reaches the target value, and when the value reaches a final target value, that is, a final value, a counter value "FFFF" and a duty value zero % are set, and the processing is terminated. In addition, at this time, the inflection point address in the speed table T1 and the like is reset.

In this way, according to the first embodiment, in the driving device in which the stepping motor 31 that uses the wavelength of the clock signal as the control value as the first motor and the brushless motor 32 that uses the duty value of the PWM signal as the control value as the second motor are used to transmit power of these motor to the single rotation shaft a71 of the conveyance roller 171, the motor controller 21 controls the control value of the first motor at multiple steps and changes the control value of the second motor according to the change range of the control value of the first motor in synchronization with the timing when the control value of the first motor is changed.

Thus, since operations of both of the stepping motor and the brushless motor can be synchronized with each other with high accuracy when the rotation shaft of the conveyance roller is driven, stable and excellent acceleration and deceleration characteristics can be obtained.

Second Embodiment

Figure 15:
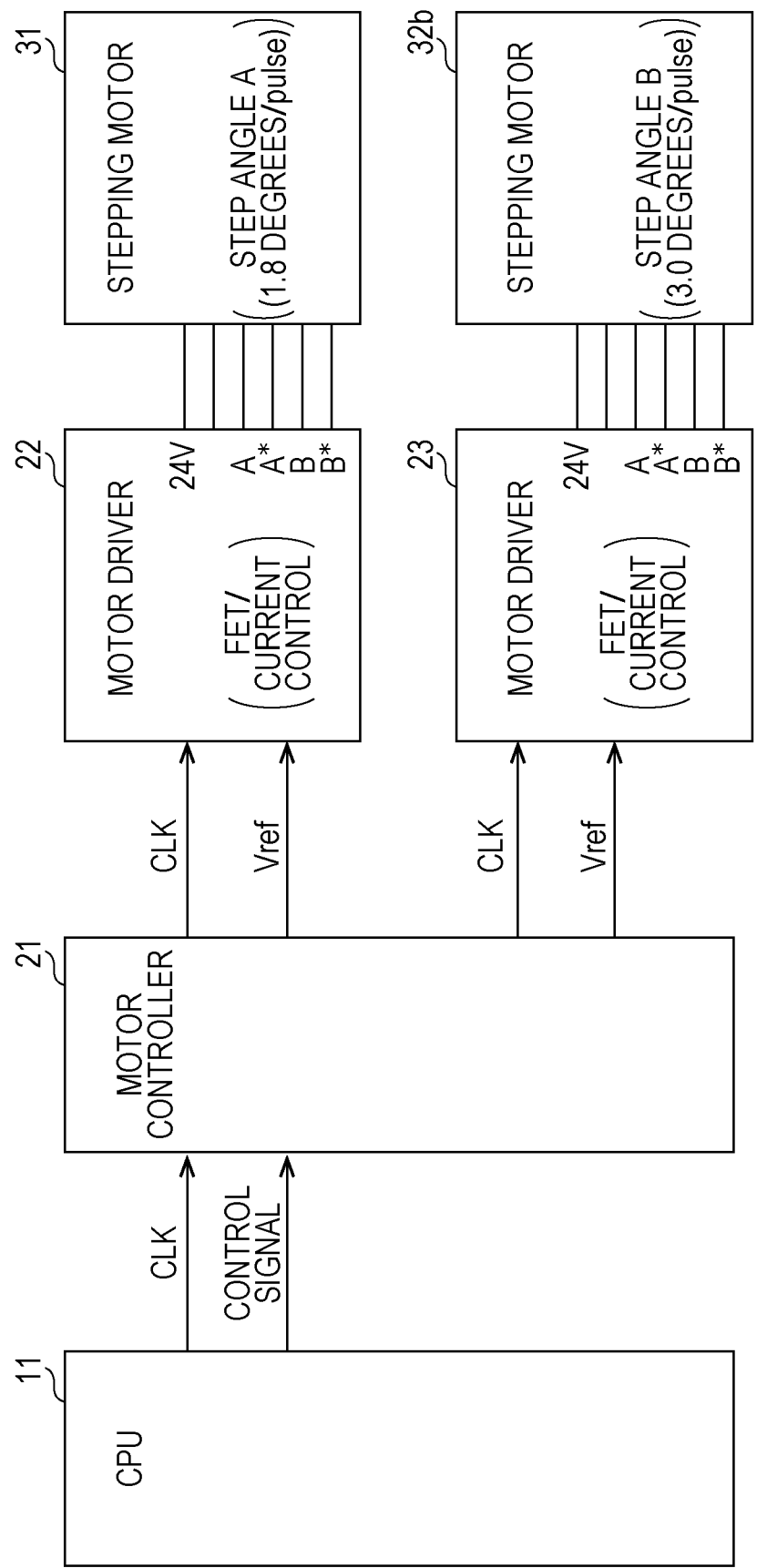
FIG. 15 is a block diagram illustrating a configuration of a driving device according to a second embodiment.

FIG. 15 is a block diagram illustrating a configuration of a driving device 20 according to a second embodiment. In the first embodiment, an example has been described in which the stepping motor 31 and the brushless motor 32 are used as first and second motors. In the second embodiment, a stepping motor 32b is used as the second motor. Furthermore, a motor driver 23 for driving the stepping motor 32b is provided. The stepping motor 31 and the stepping motor 32b have different rotation angles with respect to clock signals. For example, the rotation angle of the stepping motor 31 per pulse of the clock signal (count for two counter values) is 1.8 degrees/pulse. The same rotation angle of the stepping motor 32b is 3.0 degrees/pulse.

Even with the driving device 20 according to the second embodiment, by performing control by the motor controller 21 as in the first embodiment, an effect similar to that of the first embodiment can be obtained.

Third Embodiment

FIG. 16 is a block diagram illustrating a configuration of a driving device 20 according to a third embodiment. In the first embodiment, an example has been described in which the stepping motor 31 and the brushless motor 32 are used as first and second motors. In the third embodiment, a brushless motor for controlling a rotational speed by a clock signal is used as the first motor.

Even with the driving device 20 according to the third embodiment, by performing control by the motor controller 21 as in the first embodiment, an effect similar to that of the first embodiment can be obtained.

(Modification)

In each embodiment described above, the inflection point is set in the vicinity of the target speed (conveyance speed/ stop speed) as illustrated in FIGS. 7 and 14, and an acceleration table is applied to a point on or after the inflection point so that the drive control of the motor is realized while reducing an overshoot. However, the present invention is not limited to this, and control may be performed as in the following modification.

Figures 17A, 17B:
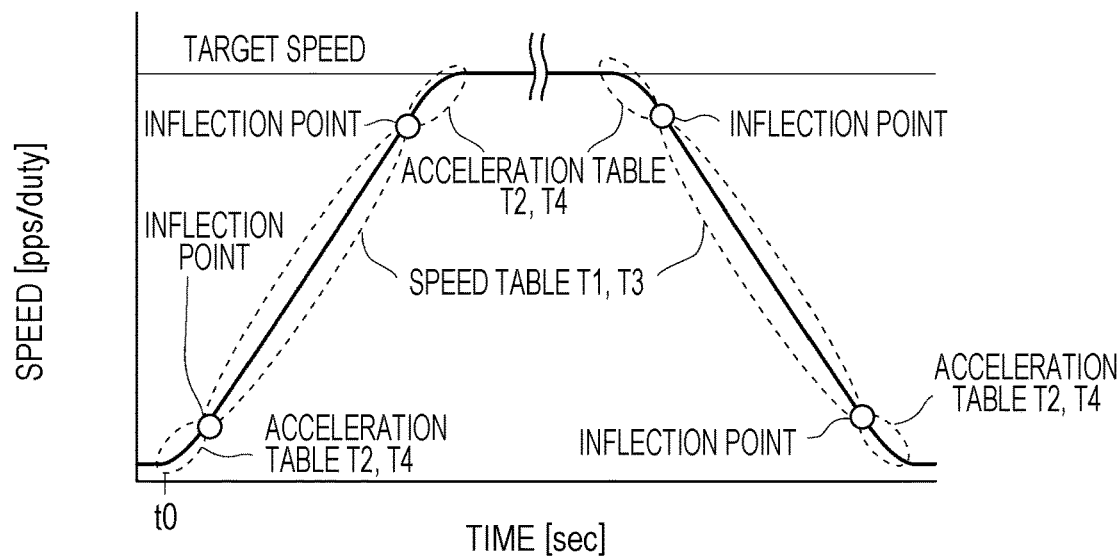
FIGS. 17A and 17B are diagrams illustrating application ranges of a speed table and an acceleration table according to a modification.

FIGS. 17A and 17B are diagrams illustrating application ranges of a speed table and an acceleration table according to the modification. As illustrated in FIG. 17A, at the time of acceleration control, drive control using acceleration tables T2 and T4 may be performed at the time of rising to constant acceleration (linear acceleration) at the time of activation (predetermined period from stop speed to inflection point). In deceleration control from the target speed (conveyance speed) to stop, the drive control using the acceleration tables T2 and T4 may be performed immediately after start of the deceleration (predetermined period from target speed to inflection point). Values in the tables T1 to T4 illustrated in FIG. 17B indicate concepts and do not coincide with the table values illustrated in FIGS. 8A and 8B and the like used in the first embodiment.

(Other Modifications)

Regarding the configuration of the driving device 20 described above and the configuration of the image forming apparatus 10 including the driving device 20, main configurations have been described as characteristics of the embodiments. The present is not limited to the above configurations, and the configurations can be variously modified as described below without departing from the scope of the claims. Furthermore, configurations included in the general driving device 20 and the general image forming apparatus 10 are not excluded.

For example, as described with reference to FIGS. 12 and 14, with an inflection address in the register setting, link destination addresses to the speed table T1 (T3) and the acceleration table T2 (T4) are set. However, the present invention is not limited to this. It is possible that a plurality of speed tables T1 (T3) corresponding to target speeds is provided in advance and a link destination address is described in each speed table T1 (T3).

Furthermore, at the time of activation, before a clock signal is output to a stepping motor 31, output of a duty value to a brushless motor 32 may be started. For example, few clocks before the clock signal to the stepping motor 31, the output of the duty value to the brushless motor 32 is started. For example, an offset is held at a reading portion of the table T1 of the stepping motor 31 and a delay is caused by the offset so that a start timing of the brushless motor 32 is changed. This can prevent occurrence of step out at the time of activation.

In addition, the motor controller 21 has been realized by the hardware circuit. However, the present invention is not limited to this, and the function of the motor controller 21 may be realized by software executed by the CPU.

Units and methods for executing various processing in the image forming apparatus 10 or the driving device 20 according to each embodiment and each modification described above can be realized by either one of a dedicated hardware circuit or a programmed computer. The program may be provided by, for example, a com-readable recording medium such as a Compact Disc Read Only Memory (CD-ROM) or may be provided via a network such as the Internet. In this case, the program recorded in the computer-readable recording medium is normally transferred to and stored in a storage such as a hard disk. Furthermore, the program may be provided as standalone application software or may be incorporated into software of a control system as one function of the control system.

Although embodiments of the present invention have been described and illustrated in detail, the disclosed embodiments are made for purposes of illustration and example only and not limitation. The scope of the present invention should be interpreted by terms of the appended claims.

What is claimed is:

1. A driving device comprising:
   a first motor that transmits power to a rotation shaft of a conveyance roller for conveying a paper sheet;
   a second motor that transmits power to the rotation shaft of the conveyance roller;
   a motor controller that controls rotational speeds of the first and second motors by changing a control value; and
   a memory that stores, regarding the control value of the first motor, a first table used for linear speed change with a constant acceleration and a second table used for non-linear speed change in a predetermined period from rotation start or a predetermined period to a target speed,
   wherein:
   the first motor is a motor that rotates at a rotational speed according to a wavelength of a clock signal as the control value,
   the motor controller controls the control value of the first motor at multiple steps at a time of acceleration and a time of deceleration and changes the control value of the second motor according to a change range of the control value of the first motor in synchronization with a timing for inverting the clock signal when the control value of the first motor is changed, and
   the motor controller changes the speed by using the first table relative to the first motor based on setting of an inflection point according to the target speed and switches to change the speed by using the second table until the speed reaches the speed at the inflection point.

2. The driving device according to claim 1, wherein:
   a counter value is described in the first table, and an acceleration value is described in the second table,
   the motor controller has a timer function for generating the clock signal by counting at a reference cycle by a set counter value, and
   the motor controller sets, as the set counter value of the timer function, one of (ii) the counter value in the first table, (ii) a counter value calculated based on the acceleration value and the counter value in the first table, and (iii) an immediately preceding counter value of said counter value.

3. The driving device according to claim 1, wherein the motor controller, at a time of acceleration control to the target speed, changes the speed by using the first table and making the speed reach the speed at the inflection point with respect to the first motor so as to switch to speed change by using the second table and perform the acceleration control to the target speed.

4. The driving device according to claim 1, wherein:
   the first motor is a stepping motor,
   the second motor is a DC brushless motor using a duty value of a PWM signal as a control value, and
   in the memory, regarding the control value relative to the second motor, a third table associated with the first table and a fourth table associated with the second table are stored.

5. The driving device according to claim 4, wherein:
   an absolute value of the duty value is described in the third table in correspondence with the first table, and
   the motor controller specifies a read address obtained by shifting the third table by one at a timing when the first motor inverts the clock signal and reads the duty value as the control value of the second motor.

6. The driving device according to claim 4, wherein:
   a change rate of the duty value is described in the third table in correspondence with the first table, and
   the motor controller changes the control value of the second motor by the change rate at a timing when the first motor inverts the clock signal.

7. The driving device according to claim 4, wherein:
   an absolute value of the duty value is described in the fourth table in correspondence with the second table, and
   the motor controller specifies a read address obtained by shifting the third table by one at a timing when the first motor inverts the clock signal and reads the duty value as the control value of the second motor.

8. The driving device according to claim 4, wherein:
   a change rate of the duty value is described in the fourth table in correspondence with the second table, and
   the motor controller changes the control value of the second motor by the change rate at a timing when the first motor inverts the clock signal.

9. The driving device according to claim 1, wherein:
   the first motor is a stepping motor, and the second motor is a DC brushless motor using a duty value of a PWM signal as a control value,
   the motor controller includes a register,
   the motor controller makes the register hold a speed at a time of start of acceleration, the target speed, and a maximum value and a minimum value of the duty value relative to the speeds at a time of acceleration control to the target speed, and when the control value of the first motor is changed by using the first table, a change amount of the duty value is calculated from a ratio of a change amount in the first table relative to an entire change amount and changes the control value of the second motor from the change amount of the duty value.

10. The driving device according to claim 1, wherein the first motor is a stepping motor, and the second motor is a DC brushless motor.

11. The driving device according to claim 10, wherein the motor controller starts to output a duty value of the brushless motor before outputting the clock signal to the stepping motor when driving is started.

12. The driving device according to claim 1, wherein:
the first motor is a stepping motor,
the control value of the second motor is a duty value of a PWM signal, and
in a case where the control value of the first motor is changed, the duty value that is the control value of the second motor is changed in synchronization with a timing when the clock signal of the first motor is inverted.

13. The driving device according to claim 1, wherein the first motor and the second motor are stepping motors having different rotation angles relative to the clock signal.

14. The driving device according to claim 1, wherein:
the first motor is a DC brushless motor mounted with a driver for changing a rotational speed according to a cycle of the clock signal,
the second motor is a DC brushless motor mounted with a driver for changing a rotational speed according to a duty value of a PWM signal, and
the motor controller changes the control value of the second motor by a change amount of the duty value according to a change amount of the cycle of the clock signal in synchronization with a timing when the clock signal of the first motor is inverted.

15. The driving device according to claim 1, wherein the motor controller is formed by a hardware circuit.

16. An image forming apparatus comprising the driving device according to claim 1.

17. A non-transitory recording medium storing a control program readable by a computer to control a driving device, the driving device including a first motor that transmits power to a rotation shaft of a conveyance roller for conveying a paper sheet, a second motor that transmits power to the rotation shaft of the conveyance roller, and a memory that stores, regarding a control value of the first motor, a first table used for linear speed change with a constant acceleration and a second table used for non-linear speed change in a predetermined period from rotation start or a predetermined period to a target speed, and the control program being executable by the computer to perform functions comprising:
changing the control value of the first motor at multiple steps at a time of acceleration and a time of deceleration and thereby changing a rotational speed of the first motor, the first motor being a motor that rotates at the rotational speed according to a wavelength of a clock signal as the control value, and the speed being changed by using the first table relative to the first motor based on setting of an inflection point according to the target speed, and switching to change the speed by using the second table until the speed reaches the speed at the inflection point; and
changing a control value of the second motor according to a change range of the control value of the first motor in synchronization with a timing for inverting the clock signal when the control value of the first motor is changed,
wherein the rotational speeds of the first motor and the second motor are changed by changing the control values.

* * * * *